United States Patent [19]

Turk

[11] 4,029,578
[45] June 14, 1977

[54] CATALYTIC PROCESS FOR OZONATION OF WATER CONTAINING ORGANIC CONTAMINANTS

[75] Inventor: Amos Turk, Danbury, Conn.

[73] Assignee: Environmental Research and Applications, Inc., Briarcliff Manor, N.Y.

[22] Filed: Sept. 4, 1975

[21] Appl. No.: 610,324

[52] U.S. Cl. .............................................. 210/63 Z
[51] Int. Cl.² ....................... C02B 1/38; C02C 5/04
[58] Field of Search ....................... 210/63 R, 63 Z; 204/176

[56] References Cited

UNITED STATES PATENTS

| 2,690,425 | 9/1954 | Moses et al. | 210/63 R |
| 3,804,756 | 4/1974 | Callahan et al. | 210/63 R |

FOREIGN PATENTS OR APPLICATIONS

| 47-19668 | 4/1972 | Japan | 210/63 Z |

Primary Examiner—Thomas G. Wyse
Attorney, Agent, or Firm—George L. Tone

[57] ABSTRACT

An improved catalytic process for the ozonation of water containing organic contaminants is disclosed. In this process the water, which may be either waste water or potable water, containing organic contaminants is contacted with ozone, preferably at a pH in the range of about 6.8 to about 7.8 (controlled by buffering if necessary), in the presence of a mixed heterogeneous catalyst comprising water insoluble salts, preferably an insoluble carbonate, sulfate, oxide, halide or sulfide, of at least two metals selected from the group consisting of copper, cadmium and the group VIII metals, preferably iron, cobalt or nickel although other group VIII metals such as platinum or Palladium may be used if desired. In a preferred embodiment, the catalyst is supported on an insoluble carrier such as aluminum oxide or a simple or complex silicate and is of a controlled particle size and density, preferably generally spherical shaped particles having an average diameter of from ½ to 5 millimeters, so as to have a settling rate of from 15 to 150 feet per hour in water at 20° C. Low cost catalysts, made from (a) incinerator ash containing substantial amounts of iron and copper and/or nickel or (b) waste pickling liquor (enriched if necessary with copper and/or nickel compounds), are described.

9 Claims, 2 Drawing Figures

CATALYTIC PROCESS FOR OZONATION OF WATER CONTAINING ORGANIC CONTAMINANTS

The present invention relates to an improved catalytic process for the ozonation of water containing organic contaminants in which the water is contacted with ozone in the presence of a mixed heterogeneous catalyst comprising the water insoluble salts of at least two metals selected from the group consisting of copper, cadmium and the group VIII metals.

BACKGROUND OF THE INVENTION

The problem of water pollution and the treatment of sewage in waste water emanating from municipal sewage collection and/or treatment systems and from industrial plants is becoming an acute problem. The effluent from these sources contains a number of refractory and carcinogenic organic impurities which are in both suspended and dissolved phases. Further, the biological processes are generally not capable of assimilating or properly altering such substances in the relatively short residence time, of 3 to 4 hours, possible in most waste water treating plants. A further problem is posed in that a number of the impurities (particularly those in the dissolved phase) cannot be removed by relatively simple mechanical processes such as by filtration and/or sedimentation.

Some prior art describes attempts to remove such contaminants by methods that involve biological conversion with the use of a trickling filter or an activated sludge process. A number of organic substances, however, are not readily subject to biological conversion without excessive residence times, and in some cases the more refractory materials are not biodegradable at all. Such materials which are not degraded or stabilized in a waste water treatment facility may impair the self-purifying capacity of the water receiving the treatment effluent. In some instances where the materials are not biodegradable at all, they may retain toxicity or interact to reduce the self purification biota of the receiving water. Further, chemicals present in the waste water effluent may adversely affect the ability of the receiving water to absorb oxygen and hence alter the self purification capabilities receiving stream.

Furthermore, many wastes from industrial operations contain materials which bear color or which can react with other organic substances to produce colored products. Many such chromophoric substances appear in waste from the pulp and paper industry and from the dye industry. Such substances are not removable in conventional prior art biological treatment facilities, nor are they easily or readily removable through physical processes such as adsorption on activated carbon. Such processing moreover may be inordinately expensive.

As indicated above, many of the organic impurities present in the effluent from a conventional waste water treatment facility may persist in the receiving stream for a long period of time and for great distances downstream. They may thus still be present as contaminants in any water withdrawn, either as an industrial or potable water supply, at points further downstream.

Ozone has been used in the purification of water for some time because of its high redox potential. Among the strong oxidizing agents including chlorine, chlorine dioxide and ozone, all of which may be used for removal of taste, odor, color or for water disinfection or purification, ozone has the highest redox potential:

$$O_3 + 2H^+ + 2e = O_2 + H_2O + 2.07 \text{ volts}$$
$$Cl_2 + 2e = 2Cl^- + 1.36 \text{ volts}$$
$$ClO_2 + e = ClO_2^- + 0.95 \text{ volts}$$

In the ozonation of water, it has heretofore been found that optimum results are obtained when the pH of the water being ozonated is controlled between about 6.8 and about 7.8. Accordingly, the water to be ozonated is, customarily, adequately buffered to ensure that there is no excessive change of acidity during the ozonation process.

It has also been found that the use of certain metal catalysts enhances the ozonation process. The catalysts suggested in the prior art include: cuprous or cupric oxide or copper sulfide or the insoluble copper halides; still other catalysts include basic nickel sulfide or other insoluble nickel or cobalt compounds.

While considerable interest has been expressed in such prior art ozonation processes (in the United States principally for the purification of waste waters and in Europe principally for the purification of potable water), they have not readily lent themselves to the purification of either waste water or potable water on a large scale in that they have either been too expensive or have otherwise been impractical for large scale decontamination. Accordingly they have found only limited use. The cost of catalysts has been a principal expense factor, and prior art processes wherein the catalyst is not recycled have been found to be prohibitively expensive.

OBJECTS OF THE INVENTION

Accordingly it is an object of the present invention to provide processes for the ozonation of water which are not only effective but are also economically feasible.

A further object of the invention is to provide a process for catalytic ozonation of water wherein a mixed heterogeneous catalyst is used.

Another object of the invention is to provide methods for the catalytic ozonation of water wherein the catalyst is suspended in the water being ozonated and has a specific gravity, shape and size such that it will settle at a predetermined rate through the water as it is being ozonated.

Still a further object of the invention is to provide low-cost catalysts for the ozonation of water.

Other and further objects of the invention may be obvious to those skilled in the art or will become apparent as the present description progresses.

SUMMARY OF THE INVENTION

Briefly stated, in accordance with the present invention, water containing organic contaminants is ozonated by contacting the water with ozone in the presence of a mixed heterogeneous catalyst comprising water insoluble salts, preferably an insoluble carbonate, sulfate, oxide, halide or sulfide, of at least two metals selected from the group consisting of copper, cadmium and the Group VIII metals, preferably iron, cobalt or nickel although other Group VIII metals such as platinum or palladium may be used if desired, and more fully described below. During the ozonation, the pH of the water being ozonated is preferably monitored and it is adequately buffered, if necessary, so as to maintain its pH within the range of about 6.8 to about 7.8.

I prefer to employ supported catalysts wherein an inert, insoluble carrier, such as aluminum oxide or a simple or complex silicate, is coated or impregnated with the active catalyst. The supported catalyst is preferably in free flowing particulate form with the individual particles preferably having a generally spherical shape and an average diameter of from ½ to 5 millimeters and having a specific gravity such that their settling rate is from 15 to 150 feet per minute in water at 20° C. Such catalysts may be used in amounts varying from 10 to 1,000 milligrams per liter of water, and preferably of from 50 to 500 milligrams per liter, as may be deemed optimum for the particular system. Since the ozone is used up stoichiometrically in reaction with the organic contaminants in the water; the amount of ozone required will depend on the amount of such impurities in the water, however, in order to assure good contact and acceptable rates of ozonation it is preferred that a concentration of at least about 1 to 2 parts per million by introduced into the contact zone.

THE DRAWINGS

Suitable apparatus for practicing the present invention is shown in the accompanying drawings, in which:

FIG. 1 is a diagrammatic, flow-chart type, illustration, partly in section, of a preferred type of system for performing the process of catalytic ozonation of the invention, wherein the used catalyst is separated from the ozonated water by sedimentation; and FIG. 2 is a diagrammatic illustration of a modified type of system, wherein the used catalyst is separated from the ozonated water by flotation.

Similar reference characters refer to similar parts throughout the drawings.

DETAILED DESCRIPTION OF THE INVENTION

Figure 1:
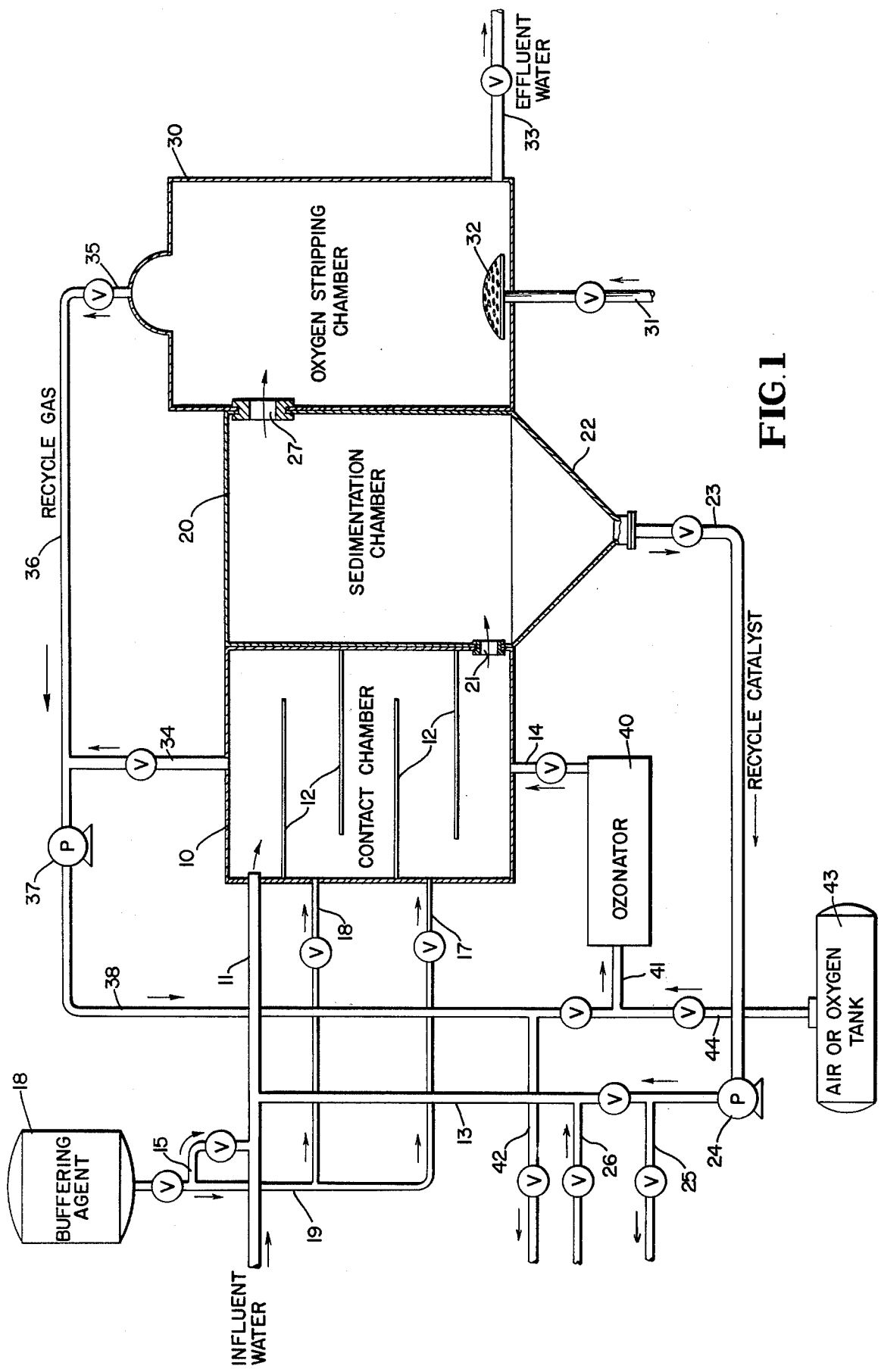

Referring now to FIG. 1 of the drawings; the water containing organic materials and which is to ozonated, is introduced into the system through valved line 11, into the top of a contact zone, illustrated as contact chamber 10. The influent water is preferably charged with the free flowing, mixed heterogeneous catalyst in the required concentration before it enters chamber 10; as shown in the drawings, the catalyst may be charged to the influent water as an aqueous slurry through valved line 13 into the stream of water flowing through line 11 and is mixed therewith as it flows to chamber 10, although a separate mixing chamber, not shown, may be provided if desired. The water with catalyst suspended therein flow circuitously downward through chamber 10 around baffles 12 provided therein. Gas containing a suitable proportion of ozone is introduced into the bottom of chamber 10 through valved line 14 and rises circuitously upward through chamber 10, countercurrent to the water and catalyst moving downwardly therein and thus helps to keep the catalyst in suspension in the water.

As previously stated, the ozonation is preferably carried out at a pH in the range of about 6.8 to about 7.8. Adequate buffering agents to achieve and maintain such a pH in the water in chamber 10 should therefore be added as needed to the influent water and/or at one or more points in chamber 10. As shown in the drawings, adequate buffereing agents may be added, advantageously as an aqueous solution, to the influent water in line 11 through valve line 15 and, if necessary, to the water in chamber 10 through valved lines 16 and 17 from buffering agent storage tank 18 via line 19.

On completion of its travel through the contact chamber 10, the water being ozonated and the catalyst pass from contact chamber 10 through opening 21 into a settling zone, illustrated as sedimentation chamber 20. The sedimentation chamber 20 is designed to have sufficient cross-sectional area that the rate of upward flow of the water therethrough will be substantially less than the settling rate of the catalyst. Thus in sedimentation chamber 20 the catalyst settles to the bottom of sedimentation chamber 20, illustrated as a conical bottom 22, from conical bottom 22 the catalyst is removed from sedimentation chamber 20, conveniently as a slurry, through valved line 23 through which it flows to pump 24 from which it may be recycled through valved line 13 to influent line 11 where it is mixed with influent water for reuse. If necessary or desired, all or part of the catalyst may be removed from the system through valved line 25 for recharging or regeneration in a manner known in the art, or it may be otherwise disposed of. Fresh or regenerated or recharged catalyst may be introduced into the system, as needed, through valved line 26 (from a suitable source and by suitable means, not shown) into valved line 13 through which it flows upwardly, along with recycled catalyst from pump 24, to influent line 11 where it is mixed with the influent water flowing to contact chamber 10. The water with catalyst suspended therein flowing through opening 21 into sedimentation chamber 20 usually will contain sufficient ozone that further decomposition action of organic material place in sedimentation chamber 20 even as the catalyst is settling.

The water, from which the catalyst has settled, passes through opening 27 into an oxygen stripping zone, illustrated as oxygen stripping chamber 30. Air, or other suitable gas, is introduced through valved line 31 and sparger or diffuser 32 at a point near the bottom of oxygen stripping chamber 30 so as to strip excess oxygen, and excess ozone, if any, from the water entering oxygen stripping zone 30 through opening 27, so as to reduce to residual values, preferably about 5 to about 10 milligrams per liter (5–10ppm.) the oxygen content of the final treated effluent exiting from the system through valved line 33.

Oxygen, and other gases, rising to, and collecting at, the top of contact chamber 10 and oxygen stripping chamber 30 are removed therefrom through valved lines 34 and 35 respectively and flow through line 36 to pump 37 where they are compressed and from which they flow through valved line 38 to be recycled or otherwise disposed of. Gasses to be recycled may flow through valved line 38 and inlet line 41 to ozonator (ozone generator) 40. If necessary or desired, all or part of the gasses flowing through valved line 38 may be withdrawn from the system through valved line 42. Air or oxygen may be introduced into the system, as needed, from air or oxygen storage tank 43 through valved line 44 and inlet line 41 into ozonator 40.

The ozonator 40 may be any of the known types of ozone generators, wherein ozone is generated from dry air or oxygen by a high voltage (5,000 to 30,000 volts) between electrodes separated by a dielectric layer (glass and air gap) through which a flow of air or oxygen is passed. Suitable known commercial ozonators are the Otto Plate type and the Welsbach ozonators more fully described in Kirk-Othmer, Encyclopedia of Chemical Technology (Second Ed.), Vol. 14, pp.

432–427. From ozonator 40, the ozone containing gas flows through valved line 14 into contact chamber 10 as heretofor described.

Figure 2:
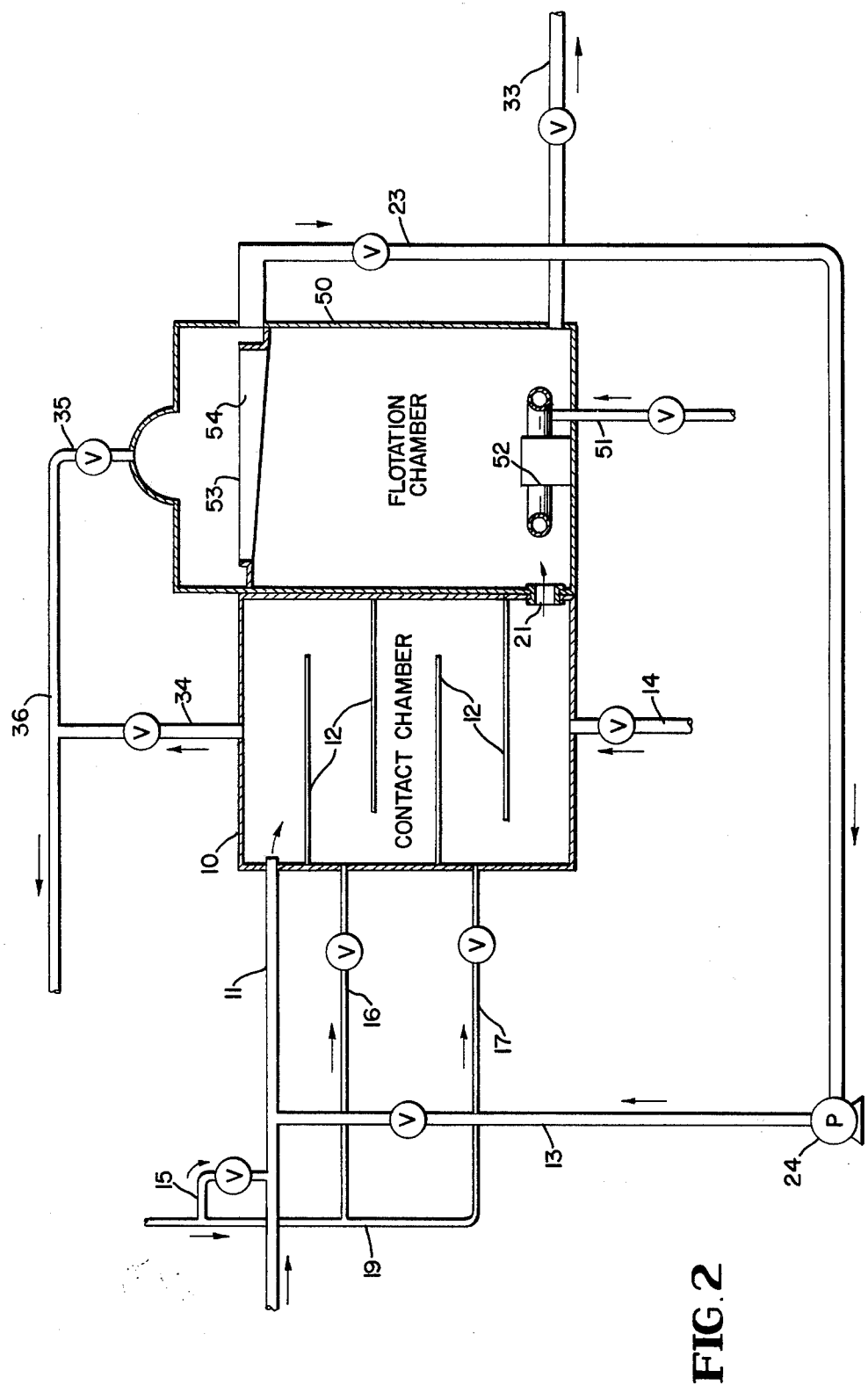

In the system illustrated in FIG. 2, the functions of catalyst separation and recovery and of oxygen and other gas stripping (which are performed by the sedimentation chamber 20 and the oxygen stripping chamber 30 in the system shown in FIG. 1) are performed by a flotation chamber 50. The construction and operation of the contact chamber 10, in FIG. 2, may be the same as that of contact chamber 10 of FIG. 1 and will not therefore be repeated here. As shown in FIG. 2, the treated water with catalyst suspended therein, exiting from contact chamber 10 through opening 21, enters flotation chamber 50 at a point near the bottom thereof where the water and catalyst are exposed to air, or other suitable gas, introduced through line 51 to diffuser 52 from which it bubbles upward through the water in flotation chamber 50. The catalyst is carried to the surface 53 by flotation where it may be removed by suitable means, illustrated as annular collecting through 54, from which the catalyst is withdrawn, advantageously as a slurry, through valved line 23 to pump 24 which moves it through valved line 13 for recycling or other disposition, as more fully heretofor described in the system illustrated in FIG. 1.

In the mixed heterogeneous catalyst, comprising water insoluble salts, preferably an insoluble carbonate, sulfate, oxide, halide or sulfide, of at least two metals selected from the group consisting of copper, cadmium and the Group VIII metals; the relative proportions of the salts of the several such metals is not critical, provided that a salt of at least two such metals is present in more than trace amounts in the active catalyst. Thus, if the active catalyst is composed of the insoluble salts of two such metals in unequal proportions, the salt of metal present in the smaller proportion should constitute at least 5%, and more preferably at least 10%, by weight of the active catalyst; obviously, however, the presence of trace amounts of an insoluble salt of a third (or more) such metal in the active catalyst is not detrimental. I prefer to employ supported catalysts wherein an inert, insoluble carrier or support, such as aluminum oxide or a simple or complex silicate, is coated or impregnated with the active catalyst. Such supported catalysts are preferably in free flowing particulate form with the individual particles preferably having a generally spherical shape and an average diameter of from ½ to 5 millimeters and having a specific gravity such that their settling rate in water at 20° C. is from 15 to 150 feet per minute. The amount of catalyst employed is not highly critical and amounts varying from 10 to 1,000 milligrams, total weight of supported catalyst per liter of water being treated may be used. The optimum amount of catalyst for any particular system may be determined by simple preliminary test and is usually in the range of 50 to 500 milligrams per liter.

A number of convenient methods for the preparation of such catalysts are known in the art. Insoluble salts, such as carbonates or sulfides, may be prepared from soluble salts by precipitation in aqueous medium on the carrier surface, or by a gas-phase reaction such as the passage of, for example, carbon dioxide or hydrogen sulfide through a bed of carrier granules that are impregnated with soluble salts of the desired metals. Metallic oxide catalysts amy be prepared by the decomposition of the nitrates or the ammonia complexes of the desired metals.

It is contemplated that incinerator ash alone may be used as the catalyst for the process of the present invention; provided that the particular incinerator ash so employed contains the requisite substantial amount of iron, e.g. as iron oxide, in combination with adequate amounts of at least one of the other required metallic compounds, e.g. copper and/or nickel compounds in an amount equal to about 5%, and preferably 10%, by weight of the iron compounds, together with adequate insoluble carrier material. Another possible source for the catalyst is waste pickling liquor which is rich in iron compounds. Such pickling liquor may, however, require enrichment with copper or nickel compounds to provide the mixed heterogeneous catalyst required. Similar enrichment may be used with incinerator ash, if needed. Regardless of the source of the catalytic material the catalyst is pelletized or granulated in substantially uniform particle size for use in the ozonation treatment of this invention.

The effectiveness of the process of the present invention in the ozonation of water containing organic contaminants is shown in following experimental examples. In these examples the effectiveness of the process is expressed in terms of the half life of the total organic matter present at various times after the beginning of ozonation; i.e., Half life = the time required for one-half the organic contaminants to be removed by oxidation. The quantity of organic contaminants present at any given time was determined by carbon analysis through the use of a total organic carbon analyzer.

EXAMPLE 1

In each of the experiments tabulated below, there was charged to a 1 liter, one necked, round bottom glass flask 500 milliliters of water which was taken from a sample collected from the effluent from a municipal secondary waste treatment facility and which contained about 100 ppm of organic impurities and had a pH of 8. A stream of air, containing 15–25 g/m$^3$ of ozone, from a Welsbach laboratory ozonator, introduced at a rate of about 200 to 400 cc./minute through a flexible plastic tube to a sparger lying on the bottom of the flask, was bubbled through the water for 20 minutes, and in Experiment C held the catylst in semi-suspension. In experiments A, B and C the water was buffered with an acetate buffer to the pH noted in the table.

The catalyst used in Experiment C was prepared by soaking overnight 25.0 g. of spherical aluminum oxide pellets having a diameter of about 4 mm. in 100 cc. of a 5% solution of equal parts by weight of cupric nitrate and ferric nitrate. The thus impregnated pellets were removed from the solution, dried in an oven at low heat and then heated to 350° C. overnight to decompose the nitrates and form a coating of about equal parts by weight of cupric oxide and ferric oxide on the pellets. The weight of coated catalyst so obtained was 25.9 g. The results were as follows:

TABLE 1.

| Exp't. | Buffered | pH at start | Weight of Catalyst Used | Half Life (minutes) |
|---|---|---|---|---|
| A | Yes | 7.7 | none | 6.9 |
| B | Yes | 7.5 | none | 6.3 |
| C | Yes |  | 100 mg (200 mg/l.) | 3.1<br>3.1 |

TABLE 1.-continued

| Exp't. | Buffered | pH at start | Weight of Catalyst Used | Half Life (minutes) |
|---|---|---|---|---|
| D | No | 8.0 | none | 10.4 |

The ozone demand for a retention time of 20 minutes was found to be between 26 mg/l. in Experiment D and 45 mg/l. in Experiment C.

EXAMPLE 2

Following the procedure of Example 1 the effectiveness of a number of catalysts was evaluated in the experiments tabulated in Table 2, below. The water used in these experiments was a 0.25 molar solution of quinoline in distilled water. The effectiveness of the catalyst was determined by ultraviolet spectrometry and the half life of quinoline decomposition was determined. The catalysts used in Experiments E through I were prepared on an artificial zeolite carrier having the approximate composition $Na_2O \cdot Al_2O_3 \cdot 2SiO_2 \cdot 6H_2O$, and in the form of spherical pellets having a diameter of about 2-3 mm. as follows:

The catalyst for Experiment E was prepared by soaking 25 g. of the zeolite pellets in 100 cc. of a 7% solution of equal parts by weight of nickel and cadmium nitrates. The thus impregnated pellets were drained completely of free liquid and dried partially in air at room temperature. A stream of carbon dioxide was then passed over the pellets to convert the salts to their insoluble carbonates. The thus treated pellets were then rinsed with water and air dried at room temperature. There was thus obtained 26.1 g. of the coated catalyst.

The catalyst for Experiment E was prepared by soaking 25 g. of the zeolite pellets in 100 cc. of a 7% solution of equal parts by weight of nickel and cadmium nitrates. The thus impregnated pellets were drained completely of free liquid and dried partially in air at room temperature. A stream of carbon dioxide gas then passed over the pellets to convert the salts to their insoluble carbonates. The thus treated pellets were then rinsed with water and air dried at room temperature. There was thus obtained 26.1 g. of the coated catalyst.

The catalyst of Experiment F was prepared by soaking overnight 25 g. of the zeolite pellets in 100 cc. of a 10% equimolar solution of the ammonia complexes of copper and cadmium in their divalent states. The solution was then drained from the pellets and the pellets dried in an oven and heated to 350° C. for 4 hours to decompose the ammonia complexes and form a coating of about equal parts by weight of cupric oxide and cadmium oxide on the pellets. There was thus obtained 25.8 g. of the coated catalyst.

The catalyst for Experiment G was prepared in the same manner as that described in Example 1 for the preparation of the catalyst used in Experiment C thereof.

The catalyst for Experiment H was prepared in two parts: The nickel oxide portion was prepared from its ammonia complex as described for copper and cadmium in Experiment F. The cadmium sulfide part was prepared as described for the carbonates in Experiment E except that hydrogen sulfide gas was used in place of carbon dioxide. The two dried catalysts were then intimately mixed in a dry blender, and the mixed catalyst was used for the experiment.

The catalyst for Experiment I was also prepared as a mixture. The nickel oxide-copper oxide portion was prepared by decomposition of the ammonia complexes as described for Experiment F. The nickel sulfide portion was prepared as described for the cadmium sulfide for Experiment H. The two dried catalysts were then mixed in a blender.

The catalysts for Experiments J and K were reagent grade granules of ferric oxide and selenium oxide, respectively of a size to pass a 5 mesh screen but retained on a 50 mesh screen.

The results were as follows:

TABLE 2.

| Exp't | Catalyst Used | Weight of Catalyst Used | Half Life (seconds) |
|---|---|---|---|
| E | $NiCO_3$—$CdCO_3$ | 82.5 mg (165 mg/l.) | 285 |
| F | CuO—CdO | 250 mg (500 mg/l.) | 300 |
| G | $Fe_2O_3$—CuO | 37.5 mg (75 mg/l.) | 300 |
| H | CdS—NiO | 150 mg (300 mg/l.) | 300 |
| I | NiS—NiO—CuO | 175 mg (350 mg/l.) | 480 |
| J | $Fe_2O_3$ | 37.5 mg (75 mg/l.) | 750 |
| K | $SeO_2$ | 37.5 mg (75 mg/l.) | 996 |

EXAMPLE 3

In the same manner as Example 2 a series of experiments were conducted to determine the pH effect on decomposition of quinoline on ozonation in the absence of any added metal compounds as catalyst. The water used in these experiments was a 0.25 molal solution of quinoline in distilled water as used in Example 2. In this series of experiments ozonation was continued for 60 minutes. The results were as follows:

TABLE 3

| Exp't | System | Start pH | Final pH after 60 Min. of ozonation | Half life (minutes) |
|---|---|---|---|---|
| L | Unbuffered | 3 | 2.85 | 13.5 |
| M | Unbuffered | 4 | 3.2 | 13.5 |
| N | Unbuffered | 6.3 | 3.2 | 6.8 |
| O | Unbuffered | 6.1 | 3.2 | 6.0 |
| P | Unbuffered | 7.2 | 3.2 | 6.5 |
| Q | Buffered | 6.86 | 6.4 | 5.5 |
| R | Buffered | 9.18 | 7.3 | 8.5 |

It will be appreciated that many of the specific operating conditions and specific features of design will be determined by, and selected in the light of, the anticipated quality the influent water, particularly the specific organic materials and the amounts thereof contained in the influent water; the degree of purification desired; and the quantity of influent water to be treated. Thus the ozone reacts stoichiometrically with the organic materials present in the influent water and the amount of ozone required will be that needed to react with and decompose the amount of organic materials to be decomposed; preferably a slight excess of ozone will be provided over that theoretically required. The time required to effect the desired degree of ozonation of the influent water, and thus the necessary residence time of the water in contact zone 10, may vary substantially depending on the specific organic impurities and type of organic impurities present in the influent water as well as the results desired. Thus the size of the contact zone, which may be either a single chamber 10 as illustrated or a plurality of chambers connected in series or parallel, will depend to a large extent on the volume of influent water to be treated in a given time and the required residence time; while the specific design of the contact zone such as the number of baffles 12 to be disposed therein, or if a plurality of contact chambers are used whether they are connected in series or parallel, will depend to a large extent on the rate of flow desired through the contact zone. Thus for any particular application, the necessary parameters of the process and the results desired must be determined and defined by adequate engineering studies and tests and the system to be used designed in accordance with good engineering practice.

Largely for economic reasons, it is preferred to employ the catalytic ozonation process of the present invention as a tertiary water treatment method for removing resistant organic materials only after bulk removal of organic matter has been accomplished by less expensive, more conventional processes; e.g. in municipal waste water treatment it is logical to apply the catalytic ozonation process of this invention to the effluent from a municipal waste water treatment facility of the trickling filter or activated sludge type.

It will be understood that the foregoing description of the process of the present invention is illustrative only of certain preferred embodiments thereof and is to be interpreted as illustrative and not in a limiting sense. Various modifications and changes, which will suggest themselves, to those skilled in the art may be made therein without departing from the spirit of this invention or the scope thereof as defined in the appended claims.

I claim:

1. In a process for the ozonation of water, wherein water containing organic material is contacted, at ambient temperature and pressure and without heating, with ozone in the presence of an insoluble ozonation catalyst suspended in said water; the improvement which comprises, employing as said ozonation catalyst a mixed heterogeneous catalyst consisting essentially of compounds selected from the group consisting of insoluble oxides and salts of at least two metals selected from the group consisting of copper, cadmium and the Group VIII metals.

2. In a process for the ozonation of water, wherein water containing organic material is contacted, at ambient temperature and pressure and without heating, with ozone in the presence of an insoluble ozonation catalyst suspended in said water; the improvement which comprises, employing as said ozonation catalyst a mixed heterogeneous catalyst consisting essentially of compounds selected from the group consisting of insoluble oxides and salts of at least two metals selected from the group consisting of copper, cadmium, iron and nickel.

3. The process as defined in claim 12, wherein said catalyst is a supported catalyst in which the catalyst composition specified is carried by an inert, insoluble catalyst carrier material.

4. The process as defined in claim 3, wherein said catalyst is in the form of pellets having a diameter in the range of about ½ to about 5 millimeters.

5. The process as defined in claim 3, wherein the inert, insoluble catalyst carrier material is selected from the group consisting aluminum oxide and simple and complex silicates.

6. The process as defined in claim 2, wherein the metal compounds in said catalyst are selected from the group consisting of the insoluble oxides, carbonates, halides, sulfides and sulfates of said metals.

7. The process as defined in claim 6, wherein one of the metal compounds in said catalyst is an iron compound.

8. The process as defined in claim 7, wherein said iron compound is ferric oxide.

9. The process as defined in claim 8, wherein said catalyst consists essentially of a mixture of copper oxide and ferric oxide.

* * * * *

UNITED STATES PATENT AND TRADEMARK OFFICE
CERTIFICATE OF CORRECTION

PATENT NO. : 4,029,578

DATED : June 14, 1977

INVENTOR(S) : Amos Turk

It is certified that error appears in the above-identified patent and that said Letters Patent are hereby corrected as shown below:

Column 2, line 5: "Clo$_2$" should read -- ClO$_2$ --.

Column 4, line 32: "material place" should read -- material takes place --.

Column 5, line 1: "432" should read -- 423 --.

Column 5, line 22: "through" should read -- trough --.

Column 5, line 68: "amy" should read -- may --.

Column 10, line 19: "claim 12" should read -- claim 2 --.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*